(12) United States Patent
Sakamoto et al.

(10) Patent No.: US 9,159,351 B2
(45) Date of Patent: Oct. 13, 2015

(54) PERPENDICULAR MAGNETIC RECORDING MEDIUM AND METHOD OF MANUFACTURING THE SAME

(75) Inventors: Kazuaki Sakamoto, Tokyo (JP); Kong Kim, Tokyo (JP); Takahiro Onoue, Singapore (SG); Masafumi Ishiyama, Singapore (SG); Teiichiro Umezawa, Singapore (SG); Kenji Ayama, Singapore (SG)

(73) Assignee: WD Media (Singapore) PTE. LTD, Singapore (SG)

(*) Notice: Subject to any disclaimer, the term of this patent is extended or adjusted under 35 U.S.C. 154(b) by 678 days.

(21) Appl. No.: 12/738,201

(22) PCT Filed: Oct. 14, 2008

(86) PCT No.: PCT/JP2008/068536
§ 371 (c)(1),
(2), (4) Date: Jun. 16, 2010

(87) PCT Pub. No.: WO2009/051090
PCT Pub. Date: Apr. 23, 2009

(65) Prior Publication Data
US 2010/0279151 A1   Nov. 4, 2010

(30) Foreign Application Priority Data

Oct. 15, 2007   (JP) .................. 2007-267421
Nov. 2, 2007    (JP) .................. 2007-286648
Mar. 28, 2008   (JP) .................. 2008-088141

(51) Int. Cl.
*G11B 5/66*   (2006.01)
*G11B 5/73*   (2006.01)

(52) U.S. Cl.
CPC .............. *G11B 5/732* (2013.01); *G11B 5/7325* (2013.01); *G11B 5/66* (2013.01)

(58) Field of Classification Search
None
See application file for complete search history.

(56) References Cited

U.S. PATENT DOCUMENTS

| | | | |
|---|---|---|---|
| 8,088,504 B2 * | 1/2012 | Shimizu .................. | 428/831 |
| 2003/0096140 A1 * | 5/2003 | Tomiyasu et al. ....... | 428/694 BS |
| 2004/0072028 A1 * | 4/2004 | Ohsawa et al. .......... | 428/694 T |
| 2004/0191466 A1 * | 9/2004 | Iwasaki et al. .......... | 428/65.6 |
| 2004/0247945 A1 * | 12/2004 | Chen et al. ............. | 428/694 TS |
| 2005/0214520 A1 | 9/2005 | Oikawa et al. | |
| 2006/0204791 A1 * | 9/2006 | Sakawaki et al. ....... | 428/828.1 |

(Continued)

FOREIGN PATENT DOCUMENTS

| | | |
|---|---|---|
| JP | 7-334832 A | 12/1995 |
| JP | 2002-197630 A | 7/2002 |
| JP | 2002-334424 A | 11/2002 |
| JP | 2003-036525 A | 2/2003 |
| JP | 2006-085742 A | 3/2006 |
| JP | 2007-128630 A | 5/2007 |

(Continued)

OTHER PUBLICATIONS

Search and Examination Report for Singapore Patent Application No. 201002637-5 dated Jun. 20, 2011, 12 pages.

*Primary Examiner* — Holly Rickman
*Assistant Examiner* — Lisa Chau

(57) ABSTRACT

A perpendicular magnetic recording medium includes a substrate, a soft magnetic layer, a pre-underlayer, an underlayer, and a main recording layer serving as a magnetic recording layer. The pre-underlayer contains seed crystal grains that serve as a base for crystal grains of the underlayer, and an addition substance that is added between the seed crystal grains and composed of an element having an atomic radius smaller than that of an element forming the seed crystal grains.

11 Claims, 7 Drawing Sheets

(56) References Cited

U.S. PATENT DOCUMENTS

2007/0099032 A1    5/2007  Das et al.
2007/0190364 A1*   8/2007  Das et al. ............... 428/832
2007/0217067 A1*   9/2007  Nakamura et al. ....... 360/126
2007/0224453 A1*   9/2007  Inamura et al. ......... 428/827
2008/0131735 A1*   6/2008  Das et al. ............... 428/831

FOREIGN PATENT DOCUMENTS

| JP | 2007-179598 A | | 7/2007 |
| JP | 2007179598 A | * | 7/2007 |
| JP | 2008-146801 A | | 6/2008 |
| WO | 2005031713 | | 4/2005 |
| WO | 2007074913 | | 7/2007 |

* cited by examiner

| | Orientation Control Layer Material | Underlayer Material | Magnetic Grain Size [nm] | Ru(002) peak $\Delta\theta_{50}$ [°] | S/N [dB] |
|---|---|---|---|---|---|
| Comparative Example 1 | NiW(Ni:92at%, W:8at%) | Ru | 8.5 | 3.0 | 20.5 |
| Comparative Example 2 | NiW-TiO2(Ni:86at%, W:8at%, TiO2:6at%) | Ru-SiO2(Ru:95at%, SiO2:5at%) | 7.7 | 3.6 | 20.8 |
| Comparative Example 3 | NiW(Ni:92at%, W:8at%) | Ru-SiO2(Ru:95at%, SiO2:5at%) | 8.1 | 3.5 | 20.7 |
| Example 1 | NiW-TiO2(Ni:86at%, W:8at%, TiO2:6at%) | Ru | 7.7 | 3.1 | 21.2 |
| Example 2 | NiW-TiO2(Ni:89at%, W:8at%, TiO2:3at%) | Ru | 8.1 | 3.0 | 21.0 |
| Example 3 | NiW-SiO2(Ni:87at%, W:8at%, SiO2:5at%) | Ru | 7.5 | 3.2 | 21.3 |
| Example 4 | NiW-Cr2O3(Ni:82at%, W:7at%, Cr2O3:11at%) | Ru | 7.9 | 3.1 | 21.0 |
| Example 5 | NiW-Ta2O5(Ni:62at%, W:5at%, Ta2O5:33at%) | Ru | 7.8 | 3.1 | 21.1 |
| Example 6 | NiW-Nb2O5(Ni:74at%, W:6at%, Nb2O5:20at%) | Ru | 7.9 | 3.2 | 21.0 |
| Example 7 | NiW-Al2O3(Ni:85at%, W:7at%, Al2O3:8at%) | Ru | 7.7 | 3.1 | 21.2 |
| Example 8 | NiPd-TiO2(Ni:86at%, Pd:8at%, TiO2:6at%) | Ru | 7.9 | 3.0 | 21.0 |
| Example 9 | NiCr-TiO2(Ni:86at%, Cr:8at%, TiO2:6at%) | Ru | 7.8 | 3.0 | 21.0 |
| Example 10 | NiMo-TiO2(Ni:86at%, Mo:8at%, TiO2:6at%) | Ru | 7.8 | 3.1 | 21.0 |
| Example 11 | NiTa-TiO2(Ni:86at%, Ta:8at%, TiO2:6at%) | Ru | 7.8 | 3.1 | 21.1 |
| Example 12 | NiV-TiO2(Ni:86at%, V:8at%, TiO2:6at%) | Ru | 7.7 | 3.2 | 20.9 |
| Example 13 | NiNb-TiO2(Ni:85at%, Nb:8at%, TiO2:6at%) | Ru | 7.8 | 3.0 | 21.0 |
| Example 14 | NiZr-TiO2(Ni:86at%, Zr:8at%, TiO2:6at%) | Ru | 7.7 | 3.1 | 21.1 |
| Example 15 | NiHf-TiO2(Ni:86at%, Hf:8at%, TiO2:6at%) | Ru | 7.9 | 3.1 | 21.0 |
| Example 16 | NiCu-TiO2(Ni:86at%, Cu:8at%, TiO2:6at%) | Ru | 7.9 | 3.1 | 21.0 |

FIG. 9

PERPENDICULAR MAGNETIC RECORDING MEDIUM AND METHOD OF MANUFACTURING THE SAME

CROSS REFERENCE TO RELATED APPLICATIONS

This application is a National Stage of International Application No. PCT/JP2008/068536 filed Oct. 14, 2008, claiming priority based on Japanese Patent Application Nos. 2007-267421, 2007-286648 and 2008-088141, filed Oct. 15, 2007, Nov. 2, 2007 and Mar. 28, 2008, respectively, the contents of all of which are incorporated herein by reference in their entirety.

TECHNICAL FIELD

This invention relates to a perpendicular magnetic recording medium adapted to be mounted in a HDD (hard disk drive) or the like of the perpendicular magnetic recording system and to a method of manufacturing the perpendicular magnetic recording medium.

BACKGROUND ART

Various information recording techniques have been developed following the increase in volume of information processing in recent years. Particularly, the areal recording density of a HDD (hard disk drive) using the magnetic recording technique has been increasing at an annual rate of about 100%. Recently, the information recording capacity exceeding 160 GB has been required per 2.5-inch magnetic disk adapted for use in a HDD or the like. In order to satisfy such a requirement, it is necessary to realize an information recording density exceeding 250 Gbit/inch$^2$.

In order to achieve the high recording density in a magnetic disk for use in a HDD or the like, a magnetic disk of the perpendicular magnetic recording system (perpendicular magnetic recording disk) has been proposed in recent years. As a perpendicular magnetic recording medium for use in the perpendicular magnetic recording system, there has been proposed a perpendicular magnetic recording medium or a CGC medium using $CoCrPt$—$SiO_2$ as a magnetic recording layer because it exhibits high thermal stability and excellent recording characteristics.

As a first background art, in order to improve the recording density in such a perpendicular magnetic recording medium, it is necessary to reduce the noise in a magnetization transition region of the magnetic recording layer (improve the S/N ratio). For that, it is necessary to improve grain separation and miniaturization of magnetic crystal grains of the magnetic recording layer.

As a method for improving the grain separation and miniaturization of the magnetic crystal grains of the magnetic recording layer, there is, for example, a method such as adjusting the composition of a target for use in a process of forming the magnetic recording layer by a sputtering method or increasing the pressure of a gas (film forming gas pressure) for use in the film formation. However, in terms of the recording density required in recent years, it is difficult to sufficiently miniaturize the magnetic crystal grains only by adjusting the composition of the target. Further, when the film forming gas pressure is increased, there is, for example, a possibility that the structure of the magnetic recording layer is affected so that sufficient reliability as a magnetic recording medium cannot be ensured.

Herein, use is conventionally made of a structure in which an underlayer adapted to control the orientation of magnetic crystal grains of a magnetic recording layer is formed under the magnetic recording layer. There is conventionally known a structure in which a layer of $Ru$—$SiO_2$ or the like is used as the underlayer (see, e.g. Patent Documents 1 and 2). In this structure, the miniaturization of the magnetic crystal grains of the magnetic recording layer is facilitated by miniaturizing crystal grains of the underlayer.

As a second background art, the easy magnetization axis of a magnetic recording layer is oriented in a plane direction of the surface of a substrate in the conventional in-plane magnetic recording system (also called the longitudinal magnetic recording system or the horizontal magnetic recording system), while the easy magnetization axis is adjusted to be oriented in a direction perpendicular to the surface of a substrate in the perpendicular magnetic recording system. As compared with the in-plane magnetic recording system, the perpendicular magnetic recording system can more suppress a thermal fluctuation phenomenon during high-density recording and thus is suitable for increasing the recording density.

Conventionally, $CoCrPt$—$SiO_2$ or $CoCrPt$—$TiO_2$ is widely used as a magnetic recording layer, wherein Co forms crystals with a hcp structure (hexagonal closest packed crystal lattice) and Cr and $SiO_2$ (or $TiO_2$) are segregated to form grain boundaries. By using such a material, since $SiO_2$ (or $TiO_2$) is segregated around ferromagnetic Co, physically independent fine Co grains tend to be formed so that high recording density tends to be achieved.

In general, an underlayer is provided for improving the crystal orientation of the magnetic recording layer. Ti, V, Zr, Hf, or the like is known as the underlayer, but as shown in Patent Document 3, Ru (ruthenium) is currently predominant. This is because it is known that Ru takes a hcp structure and effectively improves the perpendicular orientation of the easy magnetization axis of the magnetic recording layer composed mainly of Co (cobalt) to enhance the coercive force Hc, thereby achieving an increase in recording density with a predetermined S/N ratio and a predetermined resolution ensured.

It is known that even if the material is the same, the underlayer changes in film function depending on an atmospheric gas pressure in a film forming process. Patent Document 4 proposes a structure having, as an undercoat film of a perpendicular magnetic layer, a layer containing ruthenium and formed in a high-pressure argon atmosphere and a layer containing ruthenium and formed in a low-pressure argon atmosphere. In Patent Document 4, it is described that the layer containing ruthenium and formed in the low-pressure argon atmosphere (around 1 Pa) exhibits an effect for higher orientation of the magnetic layer, while the layer containing ruthenium and formed in the high-pressure argon atmosphere (about 6 Pa to 10 Pa) exhibits an effect for finer grains of the magnetic layer.

As described above, in order to achieve the increase in recording density, it is effective to miniaturize the magnetic grains. However, if the magnetic grains are excessively miniaturized, the number of atoms forming each magnetic grain becomes too small, so that the thermal fluctuation phenomenon arises as a problem like in the in-plane magnetic recording medium. In order to avoid this thermal fluctuation problem, the following method has been employed so far.

Specifically, it is a method of further providing a pre-underlayer under an underlayer and optimizing a material or a film structure of the pre-underlayer to facilitate the alignment of the orientation of crystal grains of the underlayer, thereby indirectly improving the crystal orientation of a magnetic recording layer to improve the coercive force. The material of the pre-underlayer can be selected from various materials such as, for example, Ni (nickel), Pt (platinum), and Pd (palladium).

As a third background art, in order to achieve high recording density in a magnetic disk for use in a HDD or the like, it is necessary to miniaturize magnetic crystal grains forming a magnetic recording layer serving to record an information signal, and further, to reduce the thickness of the layer. However, in the case of a conventionally commercialized magnetic disk of the in-plane magnetic recording system, as a result of the advance in miniaturization of magnetic crystal grains, there has arisen the so-called thermal fluctuation phenomenon where the thermal stability of a recorded signal is degraded due to superparamagnetism so that the recorded signal is lost, which has thus become an impeding factor for the increase in recording density of the magnetic disk. In order to solve this impeding factor, a magnetic disk of the perpendicular magnetic recording system has been proposed.

In the case of the perpendicular magnetic recording system, as is different from the in-plane magnetic recording system, the easy magnetization axis of a main recording layer is adjusted to be oriented in a direction perpendicular to the surface of a substrate. As compared with the in-plane magnetic recording system, the perpendicular magnetic recording system can suppress the thermal fluctuation phenomenon. Further, a soft magnetic layer is provided in a perpendicular magnetic recording medium to enable convergence of the magnetic flux from a recording head by the soft magnetic layer and it is possible to generate a sharp and large magnetic field as compared with an in-plane magnetic recording medium by the mirror image effect, and therefore, the perpendicular magnetic recording system is suitable for increasing the recording density.

When the magnetic recording layer has a hcp structure (hexagonal closest packed structure) in the perpendicular magnetic recording system, the easy magnetization axis is a c-axis so that it is necessary to orient the c-axis in the normal direction of the substrate. In order to improve the orientation of the c-axis, it is effective to provide a nonmagnetic underlayer with a hcp structure under the magnetic recording layer. A CoCr alloy, Ti, V, Zr, Hf, or the like is known as a material forming the underlayer, but it is known that particularly Ru (ruthenium) can effectively improve the crystal orientation of the magnetic recording layer to enhance the coercive force Hc.

In the perpendicular magnetic recording system, the S/N ratio (Signal/Noise Ratio) and the coercive force Hc are improved by forming the magnetic recording layer into a granular structure in which a nonmagnetic substance or an oxide (see, e.g. Patent Document 5) is segregated to form grain boundary portions between magnetic grains of the magnetic recording layer, thereby isolating and miniaturizing the magnetic grains. Further, in order to facilitate the miniaturization of the magnetic grains, it is important to miniaturize grains of the underlayer formed under the magnetic layer, and thus, a nonmagnetic substance or an oxide is added also to the underlayer (see, e.g. Patent Document 6).

Patent Document 1: JP-A-2002-334424
Patent Document 2: JP-A-2006-85742
Patent Document 3: JP-A-H7-334832
Patent Document 4: JP-A-2002-197630
Patent Document 5: JP-A-2003-036525
Patent Document 6: JP-A-2006-085742

DISCLOSURE OF THE INVENTION

Problem to be Solved by the Invention

This invention has been made in view of the above-mentioned various problems of the prior arts and its main object is to provide a perpendicular magnetic recording medium capable of achieving an improvement in recording density.

Specifically, with respect to the first background art, following the increasing demand for the improvement in recording density in recent years, there is required a structure of a perpendicular magnetic recording medium that can more miniaturize magnetic crystal grains of a magnetic recording layer. Further, it is required to realize such a structure by a method that does not largely increase the cost. Therefore, it is an object of a first invention to provide a perpendicular magnetic recording medium that can solve the above-mentioned subject.

With respect to the second background art, in order to improve the recording density, it is necessary to enhance the electromagnetic conversion characteristics (hereinafter abbreviated as "electro-characteristics", e.g. SN ratio) while enhancing the magnetostatic properties (hereinafter abbreviated as "static properties", e.g. coercive force Hc). This is because even if the recording density is increased by an improvement in coercive force Hc, this does not lead to an improvement in performance as a recording medium if the SN ratio is reduced.

Therefore, it is an object of a second invention to provide a magnetic recording medium that can achieve an improvement in recording density by improving the coercive force Hc and can also increase the SN ratio.

With respect to the third background art, recently, a further increase in information recording density of a magnetic disk has been required so that the information recording capacity exceeding 160 GB is required per 2.5-inch magnetic disk adapted for use in a HDD or the like. In order to satisfy such a requirement, it is necessary to realize an information recording density exceeding 250 Gbit/inch$^2$. For enabling such a high recording density, it is necessary to further miniaturize magnetic grains to improve the S/N ratio (Signal/Noise Ratio). It is known to increase the addition amount of an oxide to a magnetic recording layer for miniaturization of magnetic grains according to a conventional method. However, as the addition amount of the oxide increases, the oxide is segregated at grain boundary portions so that the distance between magnetic grains increases to reduce the density of the magnetic grains in the magnetic recording layer. When increasing the density of information recording, a recorded bit area becomes smaller while a certain number of magnetic grains are required for ensuring the output of a signal, and therefore, there is a limit to the miniaturization of magnetic grains by the addition of the oxide to the magnetic recording layer.

As another method for miniaturization of magnetic grains, it is also known that the miniaturization is enabled by adding an oxide to an underlayer to miniaturize grains of the underlayer. However, according to this method, since the crystal orientation of the underlayer may be degraded due to the addition of the oxide to degrade the crystal orientation of a magnetic layer, the control becomes difficult.

A third invention has been made in view of the above and has an object to provide a perpendicular magnetic recording medium that can, by miniaturizing grains of a pre-underlayer laminated under an underlayer, miniaturize crystal grains of the underlayer and a magnetic layer laminated over the pre-underlayer without degrading the crystal orientation and reducing the density of the crystal grains and to provide a method of manufacturing such a perpendicular magnetic recording medium.

Means for Solving the Problem (First Invention)

As a perpendicular recording medium, use is widely made of a structure in which a soft magnetic layer is formed over a substrate. This soft magnetic layer is made of, for example, an amorphous soft magnetic material. Over the soft magnetic layer, a pre-underlayer (seed layer) is formed as a first crystalline layer. The seed layer is a layer that serves as a species of crystal structures of respective layers to be formed over the soft magnetic layer and, for example, is a layer that serves as a base for an underlayer with respect to a magnetic recording layer. The underlayer, the magnetic recording layer, and so on are formed in sequence over the seed layer. For example, the underlayer controls the orientation and the grain size of magnetic crystal grains in the magnetic recording layer.

In connection with this, the inventors of this application have found that, in order to realize the recording density required in recent years, it is necessary to control not only the structure of the underlayer but also the structure of the seed layer under it. Further, the inventors have found that, by adding to crystal grains of the seed layer an addition substance in the form of an element having a smaller atomic radius than a material of the crystal grains of the seed layer, the crystal grains of the seed layer can be miniaturized. Further, the inventors have found that, by miniaturizing the crystal grains of the seed layer, it is possible to miniaturize crystal grains of the underlayer and, as a result, to also miniaturize magnetic crystal grains of the magnetic recording layer. The first invention has the following structures.

(Structure 1) A perpendicular magnetic recording medium adapted to record information by a perpendicular magnetic recording system, wherein the perpendicular magnetic recording medium comprises:

a substrate;

a soft magnetic layer formed over the substrate;

a pre-underlayer (seed layer) formed over the soft magnetic layer and containing seed crystal grains as crystal grains that serve as a base for crystal grains of an upper layer;

an underlayer formed over the pre-underlayer (seed layer) and containing crystal grains that control an orientation of crystal grains of an upper layer; and a magnetic recording layer containing magnetic crystal grains with a crystal structure that is controlled by the underlayer, wherein the pre-underlayer (seed layer) contains the seed crystal grains that serve as the base for the crystal grains of the underlayer, and an addition substance that is added between the seed crystal grains and composed of an element having an atomic radius smaller than an atomic radius of an element forming the seed crystal grains.

This perpendicular magnetic recording medium is mounted in, for example, a HDD of the perpendicular magnetic recording system.

It is considered that an element with a small atomic radius like such an addition substance enters the crystal structure of the seed layer to facilitate miniaturization of the seed crystal grains. Therefore, according to this structure, it is possible to properly miniaturize the seed crystal grains, for example. By properly miniaturizing the seed crystal grains, it is possible to properly separate the seed crystal grains therebetween, for example. Further, by this, for example, it is possible to properly miniaturize the crystal grains of the underlayer and the magnetic crystal grains of the magnetic recording layer that are formed over the seed layer, and further to properly separate the grains therebetween. Further, by the miniaturization of the magnetic crystal grains of the magnetic recording layer and the separation of the grains therebetween, it is possible to reduce the noise to thereby properly increase the recording density.

Hitherto, the necessity of controlling the grain size of the magnetic crystal grains of the magnetic recording layer by the structure of the seed layer has not been recognized. Further, the influence of the seed layer on the grain size of the magnetic crystal grains of the magnetic recording layer has not been considered.

Herein, the soft magnetic layer is, for example, a layer with an amorphous structure. The soft magnetic layer may be a laminated film of a plurality of soft magnetic material layers antiferromagnetically exchange-coupled (AFC Antiferromagnetic exchange coupling) to each other through a nonmagnetic layer interposed therebetween.

The seed crystal grains in the seed layer are, for example, crystal grains of an alloy containing Ni. The seed crystal grains may be crystal grains of an alloy of Ni and W or an alloy of Ni and Co. The seed crystal grains preferably have a crystal structure that tends to grow on a magnetic layer with an amorphous structure. Therefore, the seed crystal grains may have a crystal structure different from that of the magnetic crystal grains of the magnetic recording layer. For example, the seed crystal grains may have a bcc crystal structure or a bcc crystal structure close to amorphous.

As the addition substance in the seed layer, use can be suitably made of, for example, boron (B). Alternatively, it is considered to use, for example, carbon (C) or the like. Other than that, it is considered to use, for example, one of various interstitial elements.

The underlayer is, for example, a Ru layer containing Ru crystal grains. The crystal grains in the underlayer preferably have the same crystal structure as that of the magnetic crystal grains of the magnetic recording layer. With this structure, the orientation of the magnetic crystal grains of the magnetic recording layer can be properly controlled. The crystal grains in the underlayer have, for example, a hcp structure.

The magnetic recording layer has, for example, a magnetic granular structure in which a nonmagnetic substance (mainly an oxide) is segregated to form grain boundary portions between magnetic crystal grains (magnetic grains). The magnetic crystal grains of the magnetic recording layer are, for example, magnetic crystal grains of CoCrPt with a hcp structure and are oriented in a direction corresponding to the crystal orientation of the crystal grains of the underlayer. The nonmagnetic substance at the grain boundary portions is, for example, $TiO_2$. The nonmagnetic substance may be another oxide such as $SiO_2$.

(Structure 2) The seed crystal grains are crystal grains of an alloy of Ni and W. With this structure, it is possible to properly miniaturize the seed crystal grains of the seed layer, for example.

(Structure 3) The addition substance is a substance that does not chemically react with a material of the soft magnetic layer and the seed crystal grains. With this structure, it is possible to properly add the addition substance. Herein, "that does not chemically react with a material of the soft magnetic layer and the seed crystal grains" means that, for example, that does not substantially chemically react under the conditions in manufacturing processes of the perpendicular magnetic recording medium or in an environment during use thereof.

(Structure 4) The addition substance is a solid substance. With this structure, it is possible to properly add the addition substance. It is sufficient that the addition substance is solid, for example, under the conditions in manufacturing processes of the perpendicular magnetic recording medium or in an environment during use thereof.

(Structure 5) The addition substance is B. With this structure, it is possible to properly miniaturize the seed crystal grains of the seed layer, for example.

(Second Invention)

The inventors have made intensive studies for solving the above-mentioned subject about the second background art and have paid attention to the fact that, in order to improve the crystal orientation of a magnetic recording layer with a hcp structure, a nonmagnetic underlayer with a hcp structure serving as a base for the growth of the magnetic recording layer is important and the state of crystals of the nonmagnetic underlayer is largely affected by an intermediate layer serving as a base for the crystals of the nonmagnetic underlayer. As a result of further studies, the inventors have completed the second invention.

Specifically, according to a typical structure of the second invention, there is provided a perpendicular magnetic recording medium adapted to record information by a perpendicular magnetic recording system, the perpendicular magnetic recording medium comprising a substrate and, over the substrate, at least a soft magnetic layer, a pre-underlayer (intermediate layer), an underlayer made of Ru, and a magnetic recording layer adapted to record a signal, wherein the pre-underlayer (intermediate layer) comprises a first pre-underlayer (intermediate layer) made of a Cu alloy and a second pre-underlayer (intermediate layer) made of NiW.

When the second intermediate layer located on the upper side is CuX (X is a predetermined metal), the coercive force Hc is improved, while when the second intermediate layer is NiW, the SN ratio is improved. The order of the first and second intermediate layers may be changed. This is because even if either substance is located on the upper side, both the coercive force Hc and the SN ratio are improved by a synergistic effect as compared with the case of a single layer.

The Cu alloy may be selected from CuCr (copper-chromium alloy), CuW (copper-tungsten alloy), and CuTi (copper-titanium alloy). This is because as long as it is an alloy composed mainly of copper, it is possible to achieve an improvement in recording density without increasing the thickness of the underlayer.

The total thickness of the intermediate layer may be 5 to 12 nm. This is because, as compared with an intermediate layer in the form of a single CuX layer, the intermediate layer comprising the two layers of CuX and NiW can achieve a particularly large coercive force in this total thickness range. The upper limit of 12 nm also has a meaning of preventing that the space between a recording/reproducing head and the soft magnetic layer 14 that enables smooth recording by forming a magnetic path during recording becomes too large.

The underlayer preferably comprises a first underlayer and a second underlayer for which the gas pressures differ from each other in ruthenium film formation by sputtering.

This is because when the first or second intermediate layer is made of a Cu alloy, even if the underlayer has the above-mentioned two-layer structure, there is exhibited an effect of enhancing the orientation of the magnetic recording layer without increasing the thickness of each underlayer and, further, the layer containing ruthenium and formed in a high-pressure argon atmosphere (about 6 Pa to 10 Pa) exhibits an effect of miniaturizing grains of the magnetic recording layer.

(Third Invention)

The inventors have made intensive studies for achieving the above-mentioned object of the third invention and have found that, by adding an oxide to a pre-underlayer (orientation control layer), it is possible to miniaturize crystal grains of the pre-underlayer (orientation control layer) and crystal grains of an underlayer and a magnetic recording layer to be grown over the pre-underlayer (orientation control layer) and thus to improve the S/N ratio. Then, the inventors have studied various oxide materials and, as a result of further studies, have completed the third invention.

The pre-underlayer (orientation control layer) is preferably formed of at least one substance selected from a group comprising alloys of NiW, NiPd, NiCr, NiMo, NiTa, NiV, NiNb, NiZr, NiHf, and NiCu.

The oxide added to the pre-underlayer (orientation control layer) is preferably formed of one substance selected from a group comprising materials of $SiO_2$, SiO, $TiO_2$, TiO, $Cr_2O_3$, $Zr_2O_3$, $Ta_2O_5$, $Al_2O_3$, $W_2O_5$, $Mo_2O_5$, $V_2O_5$, and $Nb_2O_5$.

The thickness of the pre-underlayer (orientation control layer) is 1 nm or more, preferably 3 nm or more and 20 nm or less. If the pre-underlayer (orientation control layer) becomes 1 nm or less, since it is difficult to control the crystal orientation of an initial layer, the crystal orientation of the underlayer cannot be controlled. If the pre-underlayer (orientation control layer) becomes 20 nm or more, since the distance between a write head and a soft magnetic layer becomes large, a write magnetic field is weakened.

Effect of the Invention

According to this invention, it is possible to provide a perpendicular magnetic recording medium capable of achieving an improvement in recording density.

Specifically, according to the first invention, for example, it is possible to properly miniaturize crystal grains in a seed layer. By this, for example, it is possible to properly miniaturize magnetic crystal grains in a magnetic recording layer and thus to improve the recording density of a perpendicular magnetic recording medium.

According to the second invention, it is possible to provide a magnetic recording medium with a high recording density increased in both the coercive force Hc and the SN ratio as compared with a perpendicular magnetic recording medium having a single-layer intermediate layer.

According to a perpendicular magnetic recording medium and a perpendicular magnetic recording medium manufacturing method of the third invention, it is possible to miniaturize the size of magnetic grains without lowering the magnetic grain density in a magnetic layer by using a material added with an oxide as an orientation control layer. Further, the magnetic layer can be laminated with almost no degradation in crystal orientation of the magnetic grains and thus it is possible to improve the recording/reproducing characteristics of the perpendicular recording medium.

BRIEF DESCRIPTION OF THE DRAWINGS

FIG. 9 is a diagram showing the evaluation results of Examples 1 to 16 of the third invention and Comparative Examples 1 to 3.

BEST MODE FOR CARRYING OUT THE INVENTION (First Invention)

Figure 1:
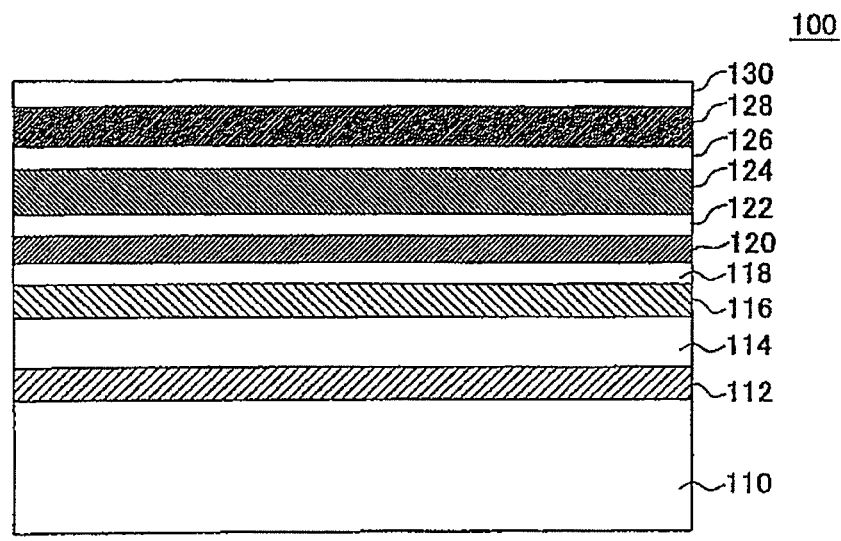
FIG. 1 is a cross-sectional view showing one example of the structure of a perpendicular magnetic recording medium 100 according to an embodiment of the first invention.

Hereinbelow, an embodiment according to the first invention will be described with reference to the drawings. FIG. 1 is a cross-sectional view showing one example of the structure of a perpendicular magnetic recording medium 100 according to the embodiment of the first invention. The perpendicular magnetic recording medium 100 is a magnetic disk for use in a HDD of the perpendicular magnetic recording system and comprises a substrate 110, an adhesive layer 112, a soft magnetic layer 114, a seed layer 116, an underlayer 118, a first onset layer 120, a second onset layer 122, a main recording layer 124, a continuous layer 126, a medium protective layer 128, and a lubricating layer 130 in this order.

The substrate 110 is a substrate (disk substrate) of the perpendicular magnetic recording medium 100. The substrate 110 is preferably a glass disk made of, for example, amorphous aluminosilicate glass or the like. Since smoothness and high rigidity are obtained, the aluminosilicate glass makes it possible to more stably reduce the magnetic spacing, particularly the flying height of a magnetic head such as a recording head. Further, it is possible to obtain high rigidity and strength by chemically strengthening the aluminosilicate glass.

Using, for example, an evacuated film forming apparatus, the respective layers from the adhesive layer 112 to the continuous layer 126 are formed in sequence on the substrate 110 in an Ar atmosphere by a DC magnetron sputtering method. The medium protective layer 128 is formed on the continuous layer 126 by, for example, a CVD method. The lubricating layer 130 is formed on the medium protective layer 128 by a dip coating method. The respective layers described above may alternatively be formed by using, for example, an in-line type film forming method. This enables, for example, uniform film formation. Hereinbelow, the structures and manufacturing methods of the respective layers will be described in further detail.

The adhesive layer 112 is a layer for preventing stripping of the soft magnetic layer 114 by improving the adhesion between the substrate 110 and the soft magnetic layer 114. As a material of the adhesive layer 112, use can be made of, for example, a Ti-containing material. In terms of practical use, the thickness of the adhesive layer 112 is preferably set to 1 nm to 50 nm. In this example, the adhesive layer 112 is formed by the use of, for example, a Ti alloy target so as to be a Ti alloy layer of 10 nm.

The soft magnetic layer 114 is a layer for forming a magnetic circuit between itself and a magnetic head and is made of, for example, an amorphous soft magnetic material. As the amorphous soft magnetic material, use can be made of, for example, FeCoTaZr. The thickness of the soft magnetic layer 114 is, for example, 40 nm to 60 nm. The soft magnetic layer 114 may be a laminated film of a plurality of soft magnetic material layers antiferromagnetically exchange-coupled (AFC Antiferro-magnetic exchange coupling) to each other through a nonmagnetic layer interposed therebetween.

The seed layer 116 is a first crystalline layer formed over the soft magnetic layer 114. In this example, the seed layer 116 is formed in contact with and just above the soft magnetic layer 114. The seed layer 116 contains seed crystal grains being crystal grains that serve as a base for crystal grains of the underlayer 118 being its upper layer and an addition substance added between the seed crystal grains. This addition substance is in the form of an element having an atomic radius smaller than that of an element forming the seed crystal grains.

The seed crystal grains in the seed layer 116 may be crystal grains having, for example, a fcc structure. As the seed crystal grains, use can be suitably made of, for example, crystal grains of an alloy containing Ni. For example, as the seed crystal grains, use can be suitably made of crystal grains of an alloy of Ni and W (NiW) or an alloy of Ni and Co (NiCo). When using, for example, the seed crystal grains of the alloy of Ni and W, this alloy is preferably an alloy containing Ni and W in the ratio of, for example, 8-12:1 in terms of the ratio of the numbers of atoms.

As the addition substance of the seed layer 116, use can be suitably made of, for example, boron (B) or the like. It is considered that such an element having a small atomic radius enters the crystal structure of the seed layer 116 to facilitate miniaturization of the seed crystal grains. Therefore, by adding such an addition substance, it is possible, for example, to properly miniaturize the seed crystal grains and, further, to properly separate the grains therebetween. By this, it is possible to more properly miniaturize the crystal grains of the underlayer 118 formed on the seed layer 116 and magnetic crystal grains of the main recording layer 124 serving as a magnetic recording layer and, further, to properly separate the grains therebetween. Further, by the miniaturization of the magnetic crystal grains of the main recording layer 124 and the separation of the grains therebetween, it is possible to reduce the noise to thereby increase the recording density. When the seed crystal grains are, for example, the alloy of Ni and W and boron (B) is used as the addition element, it is preferable to add B in the ratio of 8-10:0.5-3 in terms of the ratio of the numbers of W atoms and B atoms.

Herein, in terms of properly carrying out the addition, it is preferable that the addition substance be a solid and be a substance that does not chemically react with the material of the soft magnetic layer 114 and the seed crystal grains of the seed layer 116. Other than boron (B), it is considered to use, for example, carbon (C) or the like as the addition substance. Alternatively, it is considered to use one of various other interstitial elements.

The underlayer 118 is a layer for improving the crystal orientation of magnetic crystal grains in the main recording layer 124 and contains crystal grains that control the orientation of crystal grains of its upper layers. When the magnetic crystal grains of the main recording layer 124 have a hcp structure (hexagonal closest packed structure), the easy magnetization axis is a c-axis. Therefore, in the perpendicular magnetic recording system, it is necessary to orient the c-axis in the normal direction of the substrate 110. In order to improve the orientation of the c-axis, it is effective to provide under the main recording layer 124 the nonmagnetic underlayer 118 having a hcp structure which is the same crystal structure as that of the magnetic crystal grains of the main recording layer 124. In this example, the underlayer 118 controls the crystal orientation of the main recording layer 124 through the first onset layer 120 and the second onset layer 122.

As the underlayer 118, use can be suitably made of, for example, a Ru layer containing Ru crystal grains with a hcp structure. In this case, it is possible to effectively improve the crystal orientation of the main recording layer 124 and thus to enhance the coercive force Hc. In this example, the underlayer 118 has a structure comprising two Ru layers. In this case, it is preferable that the gas pressure of a sputtering gas for forming the Ru layer on the upper layer side be set higher than that for forming the Ru layer on the lower layer side. This makes it possible to more enhance the effect of improving the crystal orientation. As the underlayer 118, use can alternatively be made of, for example, a layer of Ti, V, Zr, Hf, or the like.

The first onset layer 120 and the second onset layer 122 are layers for facilitating miniaturization of magnetic crystal grains in the main recording layer 124. In this example, the first onset layer 120 and the second onset layer 122 are nonmagnetic granular structure layers formed in this order on the hcp structure of the underlayer 118. By forming the main recording layer 124 on the first and second onset layers 120 and 122, it is possible to separate the magnetic crystal grains therebetween from an initial stage (buildup) in the main recording layer 124 being a magnetic granular structure layer. In this example, as the first onset layer 120, use can be made of, for example, a nonmagnetic CoCr—$SiO_2$ layer. As the second onset layer 122, use can be made of, for example, a nonmagnetic CoCrPt—$Cr_2O_3$ layer.

The main recording layer 124 is one example of a magnetic recording layer and has a magnetic granular structure in which a nonmagnetic substance (mainly an oxide) is segregated to form grain boundary portions between magnetic crystal grains (magnetic grains). These magnetic crystal grains have a crystal structure controlled by the underlayer 118 through the first and second onset layers 120 and 122. In the perpendicular magnetic recording system, for example, by forming a magnetic recording layer as a granular structure layer to isolate and miniaturize magnetic crystal grains, it is possible to improve the S/N ratio (Signal/Noise Ratio) and the coercive force Hc. In this example, the main recording layer 124 is formed by the use of a hard magnetic target made of CoCrPt and containing silicon oxide ($SiO_2$) or titanium oxide ($TiO_2$) as an example of the nonmagnetic substance. By this, the main recording layer 124 becomes a granular structure layer containing magnetic crystal grains of CoCrPt with a hcp structure. These magnetic crystal grains reflect the crystal orientation of the underlayer 118 through the first and second onset layers 120 and 122 and are oriented in a direction corresponding to the crystal orientation of the crystal grains of the underlayer 118.

The thickness of the main recording layer 124 can be properly set in a range of, for example, 7 nm to 15 nm. The target for forming the main recording layer 124 has a composition containing, for example, CoCrPt and $TiO_2$ (or $SiO_2$) in the ratio of about 9:1 (mol %). By this, for example, the nonmagnetic substance is segregated to form grain boundaries around the magnetic substance. Then, magnetic crystal grains become columnar to form a granular structure. Further, these magnetic crystal grains are epitaxially grown continuously from the granular structure in the first and second onset layers 120 and 122. By this, the main recording layer 124 with the granular structure can be properly formed.

The continuous layer 126 is a layer in which the magnetism continues in the plane direction. The continuous layer 126, for example, enhances the thermal stability of magnetic recording by the main recording layer 124 through exchange coupling with the main recording layer 124. In this example, the continuous layer 126 is a CoCrPtB film. The thickness of the continuous layer 126 is preferably 10 nm or less and more preferably 5 nm or less.

The medium protective layer 128 is a layer for protecting the main recording layer 124 from an impact of a magnetic head. The medium protective layer 128 is formed by, for example, forming a carbon film by the CVD method while maintaining a vacuum after forming the continuous layer 126. In general, carbon formed into a film by the CVD method is improved in film hardness as compared with that by the sputtering method. Accordingly, this makes it possible to protect the main recording layer 124 more effectively against the impact from the magnetic head.

The carbon film forming the medium protective layer 128 is, for example, a film of hydrocarbon (hydrogenated carbon). Using hydrogenated carbon, it is possible to properly improve the film strength. Accordingly, it is possible to more properly protect the main recording layer 124 against the impact from the magnetic head.

The lubricating layer 130 is a layer for increasing the lubricity of the surface of the perpendicular magnetic recording medium 100 with respect to the magnetic head. The lubricating layer 130 is formed by the dip coating method using, for example, PFPE (perfluoropolyether). PFPE has a straight chain structure to thereby exhibit proper lubrication performance necessary for a magnetic disk. Further, because of having hydroxyl groups (OH) as end groups, it can exhibit high adhesion performance with respect to the medium protective layer 128 in the form of a carbon film. The thickness of the lubricating layer 130 is preferably set to, for example, about 1 nm (e.g. 0.5 nm to 2 nm).

In the perpendicular magnetic recording medium 100, for example, the respective layers other than the seed layer 116 may be formed by, for example, processes that are the same as or similar to those for known layers corresponding to such respective layers. Even the seed layer 116 may be formed by, for example, processes that are the same as or similar to those for a known layer except the above-mentioned point.

Hereinbelow, the first invention will be described in further detail by an Example and a Comparative Example.

Example 1

First, an amorphous aluminosilicate glass was molded into a disk shape by direct press, thereby producing a glass disk. Then, this glass disk was ground, polished, and chemically strengthened in sequence, thereby obtaining the substrate 110 being a smooth nonmagnetic disk substrate in the form of a chemically strengthened glass disk. The substrate 110 was a 2.5-inch magnetic disk substrate having a diameter of 65 mm, an inner diameter of 20 mm, and a disk thickness of 0.635 mm. The surface roughness of the obtained substrate 110 was observed by an AFM (atomic force microscope) and it was confirmed to be a smooth surface with Rmax of 2.18 nm and Ra of 0.18 nm. Rmax and Ra follow Japanese Industrial Standard (JIS).

Then, the adhesive layer 112, the soft magnetic layer 114, the seed layer 116, the underlayer 118, the first onset layer 120, the second onset layer 122, the main recording layer 124, and the continuous layer 126 were formed in sequence on the substrate 110 by DC magnetron sputtering.

First, as the adhesive layer 112, a CrTi layer of 10 nm was formed. Then, as the soft magnetic layer 114, there was formed a laminated film of two soft magnetic material layers antiferromagnetically exchange-coupled to each other through a nonmagnetic layer interposed therebetween. In the formation of the soft magnetic layer 114, an amorphous FeCoTaZr layer of 25 nm was first formed as the first-layer soft magnetic material layer. Then, a Ru layer of 2 nm was formed as the nonmagnetic layer. Then, as the second-layer soft magnetic material layer, an amorphous FeCoTaZr layer of 25 nm was formed in the same manner as the first-layer soft magnetic material layer.

Subsequently, on the soft magnetic layer 114, the seed layer 116 of 10 nm was formed by the use of a target (Ni-8W-3B) containing Ni, W, and B in the ratio of 89:8:3 in terms of the ratio of the numbers of atoms. In this Example, the seed layer 116 contains crystal grains (seed crystal grains) of an alloy of Ni and W and B as an addition substance.

Then, two Ru layers were formed as the underlayer 118. The thickness of each Ru layer was set to 10 nm. The gas pressure of a sputtering gas during the formation of the Ru layer on the lower layer side was set smaller than that during the formation of the Ru layer on the upper layer side.

Then, as the first onset layer 120, a CoCr—$SiO_2$ layer of 1.0 nm was formed. Further, as the second onset layer 122, a CoCrPt—$Cr_2O_3$ layer of 3 nm was formed.

Then, using a hard magnetic target made of CoCrPt—$TiO_2$ with a hcp structure, a CoCrPt—$TiO_2$ layer of 8 nm was formed as the main recording layer 124. Then, as the continuous layer 126, a CoCrPtB film of 7.5 nm was formed.

Then, subsequently to the formation of the continuous layer 126, the medium protective layer 128 made of hydrocarbon (hydrogenated carbon) was formed by the CVD method. The thickness of the medium protective layer 128 was set to 5 nm. Then, thereafter, the lubricating layer 130 made of PFPE (perfluoropolyether) was formed by the dip coating method. The thickness of the lubricating layer 130 was set to 1 nm. In the manner as described above, the perpendicular magnetic recording medium 100 according to Example 1 was manufactured.

Comparative Example 1

A perpendicular magnetic recording medium according to Comparative Example 1 was manufactured in the same manner as in Example 1 except that B was not added to a target when forming a seed layer 116. In Comparative Example 1, the seed layer was composed of crystal grains (seed crystal grains) of an alloy (Ni-8W) of Ni and W.

(Evaluation)

With respect to the perpendicular magnetic recording media according to Example 1 and Comparative Example 1, the recording/reproducing characteristics were evaluated while changing the track width, thereby measuring the relationship between the track width and the bit error rate. The evaluation of the recording/reproducing characteristics was performed using a R/W analyzer and a magnetic head of the perpendicular magnetic recording system. As the magnetic head, use was made of a magnetic head having a SPT element on the recording side and a GMR element on the reproducing side. The flying height of the magnetic head was set to 10 nm.

Figure 2:
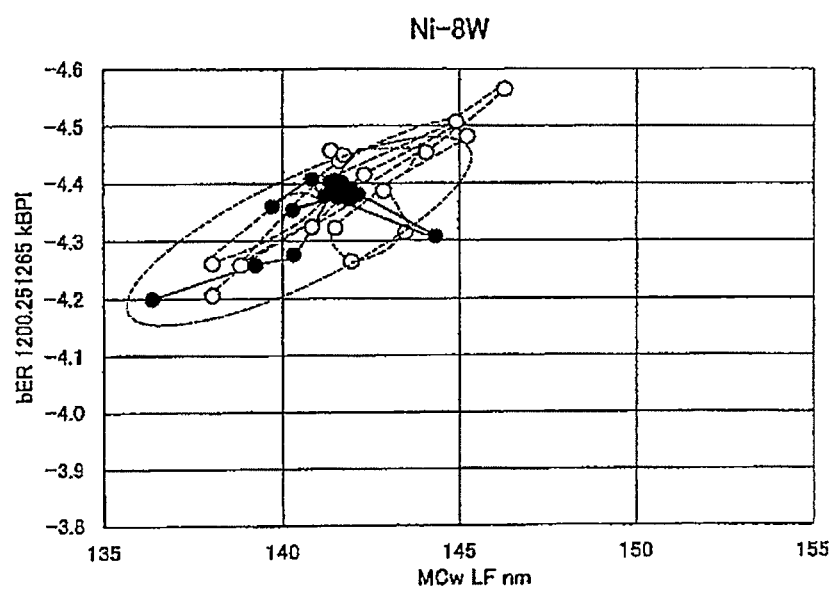
FIG. 2 is a graph showing the relationship between the track width and the bit error rate in Comparative Example 1.
Figure 3:
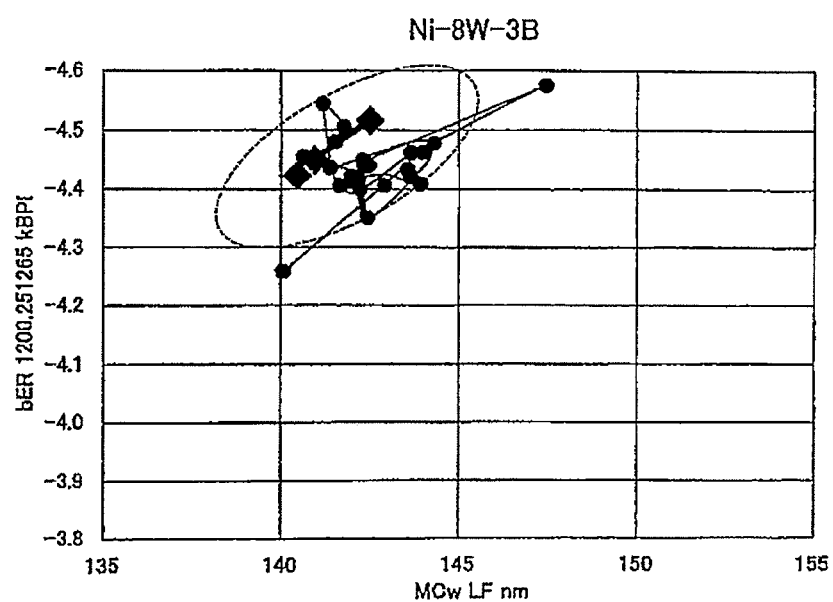
FIG. 3 is a graph showing the relationship between the track width and the bit error rate in Example 1 of the first invention.

FIG. 2 is a graph showing the relationship between the track width and the bit error rate in Comparative Example 1. FIG. 3 is a graph showing the relationship between the track width and the bit error rate in Example 1. In each graph, the abscissa axis (McwLF nm) represents the track width and the ordinate axis (bER 1200.251265 kBPI) represents the bit error rate.

The bit error rate shows a smaller error rate as the absolute value of its negative value increases to move upward in the graph. Therefore, from FIGS. 2 and 3, it is confirmed that the bit error rates of Example 1 are better as compared with Comparative Example 1. Accordingly, it is confirmed that the recording density of the perpendicular magnetic recording medium can be improved by adding B to the seed layer 116. This is considered to be because miniaturization and separation of crystal grains of the respective layers subsequent to the seed layer 116 were advanced.

While the first invention has been described with reference to the embodiment, the technical scope of the first invention is not limited to the scope of the description of the above-mentioned embodiment. It is obvious to a person skilled in the art that various changes or improvements can be added to the above-mentioned embodiment. It is clear from the description of claims that the modes added with such changes or improvements can also be included in the technical scope of this invention.

(Second Invention)

Next, referring to the accompanying drawings, an embodiment of a perpendicular magnetic recording medium according to the second invention will be described in detail. In the figure, illustration of components not directly related to the second invention is omitted. Similar components are denoted by the same reference symbols. Sizes, materials, specific numerical values, and so on shown in the following embodiment are only illustrative for facilitating understanding of the invention and are not intended to limit the second invention unless otherwise specified.

Figure 4:
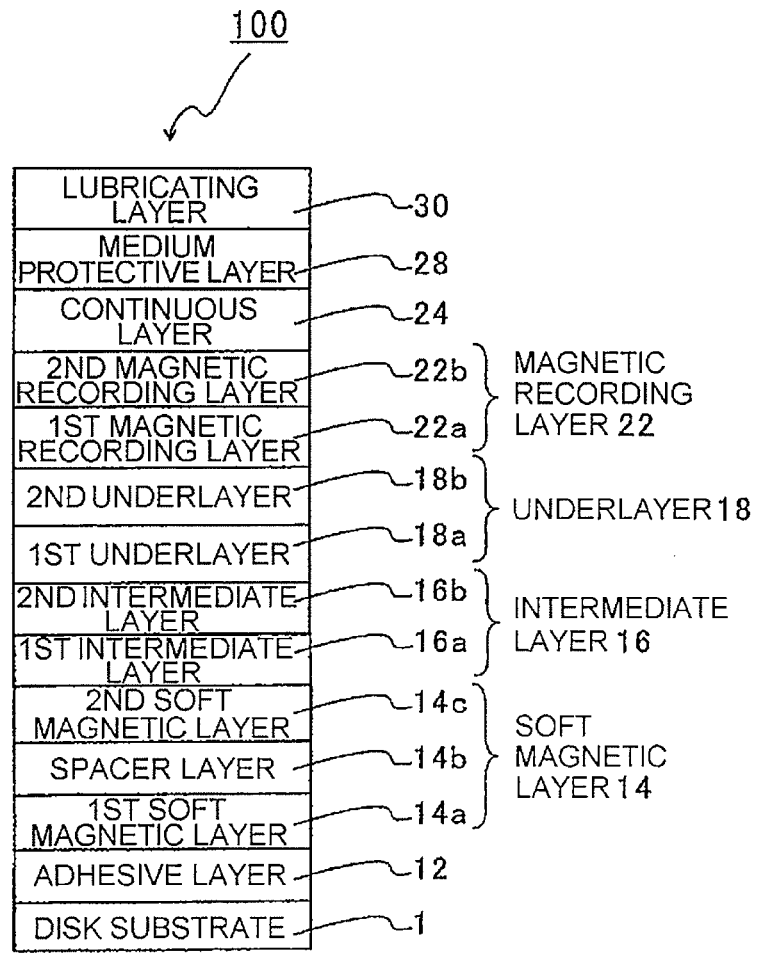
FIG. 4 is a diagram for explaining the structure of a magnetic recording medium according to an embodiment of the second invention.

FIG. 4 is a diagram for explaining the structure of a perpendicular magnetic recording medium according to this embodiment. A perpendicular magnetic recording medium 100 shown in FIG. 4 comprises a disk substrate 1, an adhesive layer 12, a first soft magnetic layer 14a, a spacer layer 14b, a second soft magnetic layer 14c, an intermediate layer 16, a first underlayer 18a, a second underlayer 18b, a first magnetic recording layer 22a, a second magnetic recording layer 22b, a continuous layer 24, a medium protective layer 28, and a lubricating layer 30. The first soft magnetic layer 14a, the spacer layer 14b, and the second soft magnetic layer 14c jointly form a soft magnetic layer 14. The first underlayer 18a and the second underlayer 18b jointly form an underlayer 18. The first magnetic recording layer 22a and the second magnetic recording layer 22b jointly form a magnetic recording layer 22.

First, an amorphous aluminosilicate glass was molded into a disk shape by direct press, thereby producing a glass disk. This glass disk was ground, polished, and chemically strengthened in sequence, thereby obtaining the smooth nonmagnetic disk substrate 1 in the form of a chemically strengthened glass disk.

Using an evacuated film forming apparatus, the layers from the adhesive layer 12 to the continuous layer 24 were formed in sequence on the obtained disk substrate 1 in an Ar atmosphere by a DC magnetron sputtering method, then the medium protective layer 28 was formed by a CVD method. Thereafter, the lubricating layer 30 was formed by a dip coating method. In terms of high productivity, it is also preferable to use an in-line type film forming method.

The adhesive layer 12 was formed by the use of a Ti-alloy target so as to be a Ti-alloy layer of 10 nm. By forming the adhesive layer 12, the adhesion between the disk substrate 1 and the soft magnetic layer 14 can be improved and, therefore, it is possible to prevent stripping of the soft magnetic layer 14. As a material of the adhesive layer 12, use can be made of, for example, a CrTi alloy.

By interposing the nonmagnetic spacer layer 14b between the first soft magnetic layer 14a and the second soft magnetic layer 14c, the soft magnetic layer 14 was configured to have AFC (Antiferro-magnetic exchange coupling). By this, magnetization directions of the soft magnetic layer 14 can be aligned along a magnetic path (magnetic circuit) with high accuracy and thus the perpendicular component in the magnetization direction is extremely reduced, so that it is possible to reduce noise generated from the soft magnetic layer 14. Specifically, the composition of the first soft magnetic layer 14a and the second soft magnetic layer 14c was CoFeTaZr and the composition of the spacer layer 14b was Ru (ruthenium).

The intermediate layer 16 being a feature of this embodiment has a function of facilitating the alignment of the orientation of crystal grains of the underlayer 18. This will be described later.

The underlayer 18 has a hcp structure and can grow crystals with a hcp structure of the magnetic recording layer 22 into a granular structure. Therefore, as the crystal orientation of the underlayer 18 is enhanced, it is possible to improve the orientation of the magnetic recording layer 22. A material of the underlayer can be selected from RuCr and RuCo, other than Ru. Ru takes a hcp structure and can well orient the magnetic recording layer composed mainly of Co.

The underlayer 18 has a two-layer structure made of Ru. When forming the second underlayer 18b on the upper layer side, the Ar gas pressure was set higher than that set when forming the first underlayer 18a on the lower layer side. As the gas pressure increases, the mean free path of sputtered grains decreases and thus the film forming rate decreases to make it possible to improve the crystal orientation. Further, the size of a crystal lattice decreases as the pressure increases. Since the size of a Ru crystal lattice is larger than that of a Co crystal lattice, if the size of the Ru crystal lattice is reduced, it approaches that of the Co crystal lattice so that it is possible to further improve the crystal orientation of the Co granular layer.

As the first magnetic recording layer 22a, a CoCrPt—$Cr_2O_3$ hcp crystal structure of 2 nm was formed by the use of a hard magnetic target made of CoCrPt and containing chromium oxide ($Cr_2O_3$) as an example of a nonmagnetic substance. The nonmagnetic substance was segregated to form grain boundaries around the magnetic substance. Magnetic grains formed a granular structure in which grain boundary portions made of the nonmagnetic substance were formed between crystal grains grown into a columnar shape. These magnetic grains were epitaxially grown continuously from the granular structure of the underlayer.

As the second magnetic recording layer 22b, a CoCrPt—$TiO_2$ hcp crystal structure of 10 nm was formed by the use of a hard magnetic target made of CoCrPt and containing titanium oxide ($TiO_2$) as an example of a nonmagnetic substance. Also in the second magnetic recording layer 22b, magnetic grains formed a granular structure.

In this embodiment, the first magnetic recording layer 22a and the second magnetic recording layer 22b are made of the different materials (targets), but not limited thereto, i.e. they may be made of a material of the same composition or kind. As the nonmagnetic substance for forming the nonmagnetic region, silicon oxide (SiOx), chromium (Cr), chromium oxide ($CrO_x$), titanium oxide ($TiO_2$), zirconium oxide ($ZrO_2$), and tantalum oxide ($Ta_2O_5$) can be given as examples, for example.

As the continuous layer 24, a thin film (continuous layer) magnetically continuous in the plane direction and adapted to exhibit high perpendicular magnetic anisotropy was formed on the granular magnetic layer. The continuous layer 24 has a CGC (Coupled Granular Continuous) structure. By this, it is possible to add high heat resistance of the continuous film in addition to high-density recordability and low noise of the granular layer.

The medium protective layer 28 was formed by film formation of carbon by the CVD method while maintaining a vacuum and contained diamond-like carbon. The medium protective layer 28 is a protective layer for protecting the perpendicular magnetic recording layer from an impact of a magnetic head. Since, in general, carbon formed into a film by the CVD method is improved in film hardness as compared with that by the sputtering method, it is possible to protect the perpendicular magnetic recording layer more effectively against the impact from the magnetic head. In the CVD method, it is possible to improve the film hardness by raising the bias voltage.

The lubricating layer 30 was formed of PFPE (perfluoropolyether) by the dip coating method. The thickness of the lubricating layer 30 was about 1 nm.

(Intermediate Layer)

The above-mentioned intermediate layer being the feature of this embodiment will be further described in detail. This embodiment is, as already described, the perpendicular magnetic recording medium 100 in which at least the soft magnetic layer 14, the intermediate layer 16, the underlayer 18 made of ruthenium, and the magnetic recording layer 22 adapted to record a signal are formed in this order on the disk substrate. The intermediate layer 16 may also be called an orientation control layer or a seed layer and, as long as it is located under the underlayer 18, its function or composition should not be limitedly interpreted by its name.

The intermediate layer 16 is characterized by comprising a first intermediate layer 16a made of a Cu alloy and a second intermediate layer 16b made of NiW.

When the second intermediate layer 16b located on the upper side is CuX (X is a predetermined metal), the coercive force Hc is improved, while when the second intermediate layer 16b is NiW, the SN ratio is improved. The order of the first and second intermediate layers 16a and 16b may be changed. This is because even if either substance is located on the upper side, both the coercive force Hc and the SN ratio are improved as compared with the case of a single layer.

The Cu alloy may be selected from CuCr (copper-chromium alloy), CuW (copper-tungsten alloy), and CuTi (copper-titanium alloy). This is because as long as it is an alloy composed mainly of copper, it is possible to achieve an improvement in recording density without increasing the thickness of the underlayer.

The total thickness of the intermediate layer 16 (the sum of the thickness of the first intermediate layer 16a and the thickness of the second intermediate layer 16b) may be 5 to 12 nm. This is because, as shown in later-described FIG. 7, as compared with an intermediate layer in the form of a single CuX layer, an intermediate layer in the form of two layers of CuX and NiW can achieve a particularly large coercive force in this total thickness range.

The upper limit of 12 nm also has a meaning of preventing that the space between a recording/reproducing head and the soft magnetic layer 14 that enables smooth recording by forming a magnetic path during recording becomes too large.

The underlayer preferably comprises a first underlayer and a second underlayer for which the gas pressures differ from each other in ruthenium film formation by sputtering.

This is because when the first intermediate layer 16a or the second intermediate layer 16b is made of a Cu alloy, even if the underlayer has the above-mentioned two-layer structure, there is exhibited an effect of enhancing the orientation of the magnetic recording layer without increasing the thickness of each underlayer and, further, the layer containing ruthenium and formed in a high-pressure argon atmosphere (about 3 Pa to 10 Pa) exhibits an effect of miniaturizing the grains of the magnetic recording layer.

(Evaluation)

Figure 5:
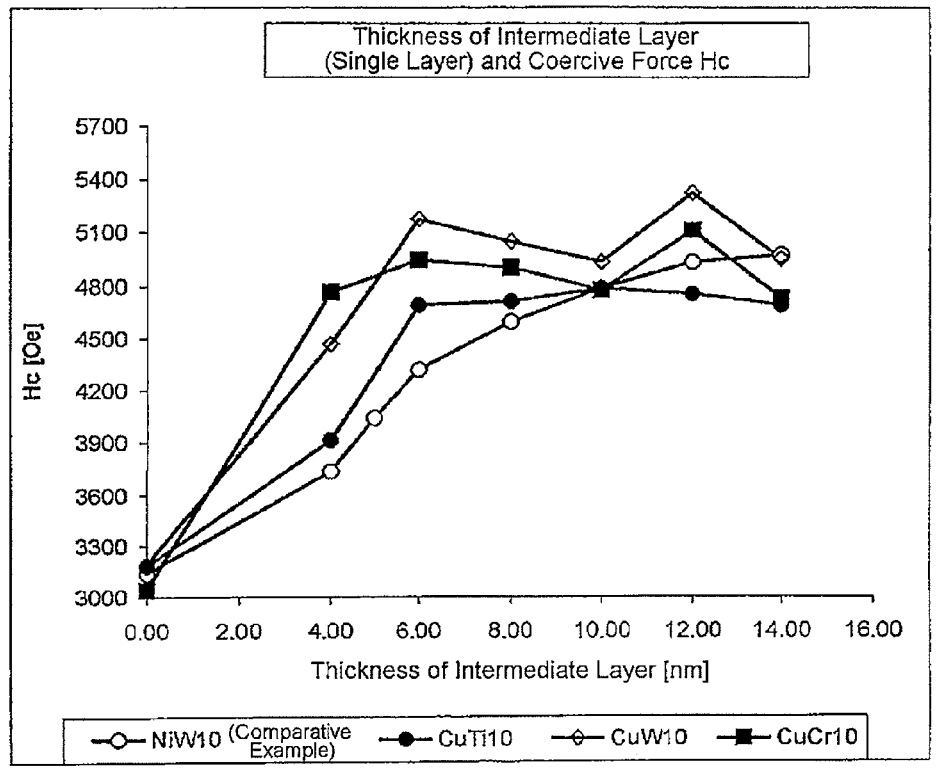
FIG. 5 is a graph showing the relationship between the thickness of an intermediate layer (single layer) and the coercive force Hc.

FIG. 5 is a graph showing the relationship between the thickness of an intermediate layer (single layer) and the coercive force Hc. According to FIG. 5, each of a NiW intermediate layer and Cu-based alloy intermediate layers achieves the peak of the coercive force Hc as its thickness increases. Although FIG. 5 shows the coercive forces in the case of the single-layer intermediate layers, respectively, it is considered that the total thickness of the intermediate layer 16 comprising the first and second intermediate layers 16a and 16b made of NiW and a Cu-based alloy, respectively, is also preferably 3 to 12 nm.

Figure 6:
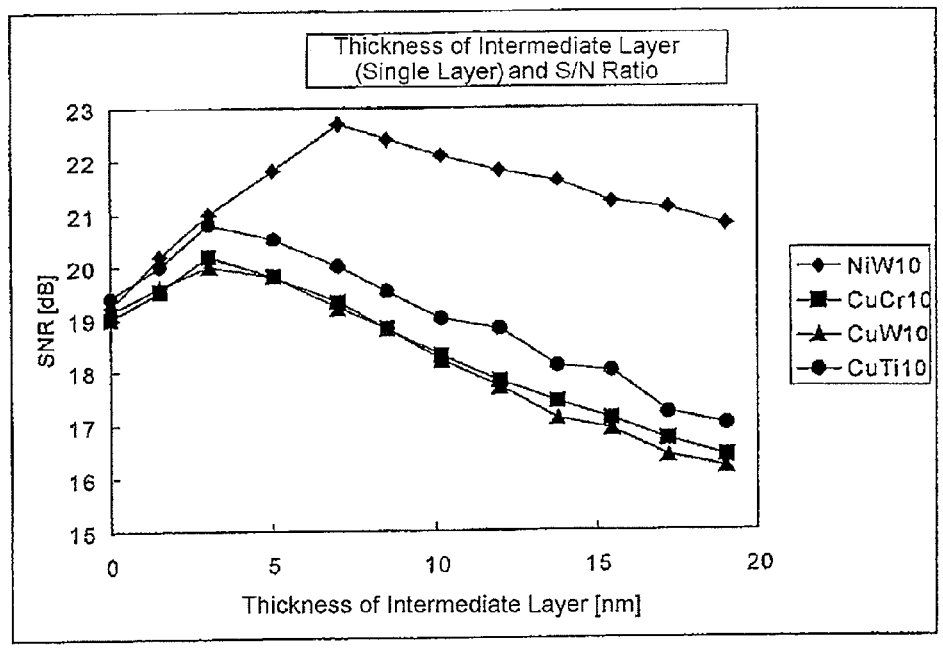
FIG. 6 is a graph showing the relationship between the thickness of an intermediate layer (single layer) and the S/N ratio.

FIG. 6 is a graph showing the relationship between the thickness of an intermediate layer (single layer) and the S/N ratio. According to FIG. 6, an intermediate layer in the form of a NiW single layer achieves the peak of the S/N ratio at 8 nm, while each of intermediate layers each in the form of a Cu-based alloy single layer achieves the peak of the S/N ratio at 3 nm. Although FIG. 6 shows the S/N ratios in the case of the single-layer intermediate layers, respectively, it is considered that an excellent S/N ratio can be obtained if the total thickness of the intermediate layer 16 comprising the first and second intermediate layers 16a and 16b made of NiW and a Cu-based alloy, respectively, is also set to about 3 to 12 nm.

Figure 7:
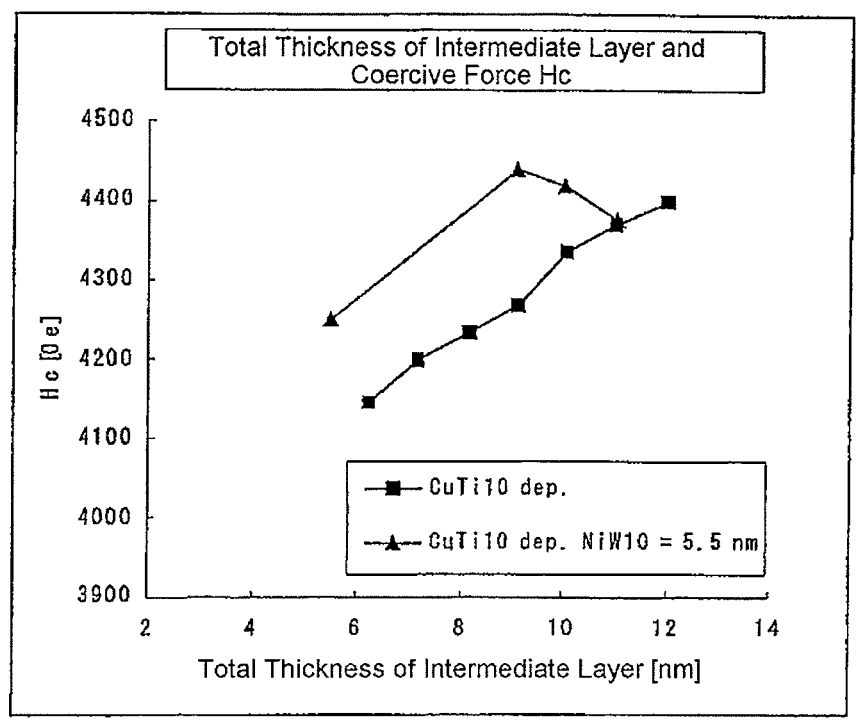
FIG. 7 is a graph showing the relationship between the total thickness of an intermediate layer comprising two layers of CuTi and NiW and the coercive force Hc in comparison with an intermediate layer in the form of a CuTi single layer.

FIG. 7 is a graph showing the relationship between the total thickness of an intermediate layer comprising two layers of CuTi and NiW and the coercive force Hc in comparison with an intermediate layer in the form of a CuTi single layer. In this graph, the total thickness of the intermediate layer comprising the two layers is changed by changing the thickness of CuTi while maintaining the thickness of NiW constant at 5.5 nm. As compared with the CuTi single layer, the intermediate layer comprising the two layers of CuTi and NiW can obtain a clearly higher coercive force Hc at the same total thickness of 5 nm or more.

On the other hand, the upper limit of 12 nm is determined because it is a point where a reversal of the coercive force Hc starts to occur as shown in FIG. 7. As already described, it also has a meaning of preventing that the space between a recording/reproducing head and the soft magnetic layer 14 that enables smooth recording by forming a magnetic path during recording becomes too large.

In conclusion, taking into account also FIG. 7, it is considered that the total thickness of the intermediate layer 16 comprising the two layers is preferably 5 to 12 nm. On the other hand, as presumed from FIGS. 5 and 6, it may be set to 3 to 12 nm. With the intermediate layer 16 having such a thickness, when the second intermediate layer 16b located on the upper side is CuX (X is a predetermined metal), the coercive force Hc is improved, while when the second intermediate layer 16b is NiW, the SN ratio is improved. The order of the first and second intermediate layers 16a and 16b may be changed. This is because even if either substance is located on the upper side, both the coercive force Hc and the SN ratio are improved by a synergistic effect as compared with the case of a single layer.

While the preferred embodiment of the second invention has been described with reference to the accompanying drawings, it is needless to say that the second invention is not limited thereto. It is apparent that a person skilled in the art can think of various changes and modifications in the category described in claims and it is understood that those also naturally belong to the technical scope of this invention.

(Third Invention)

Hereinbelow, an embodiment of the third invention will be described with reference to the drawings.

Figure 8:
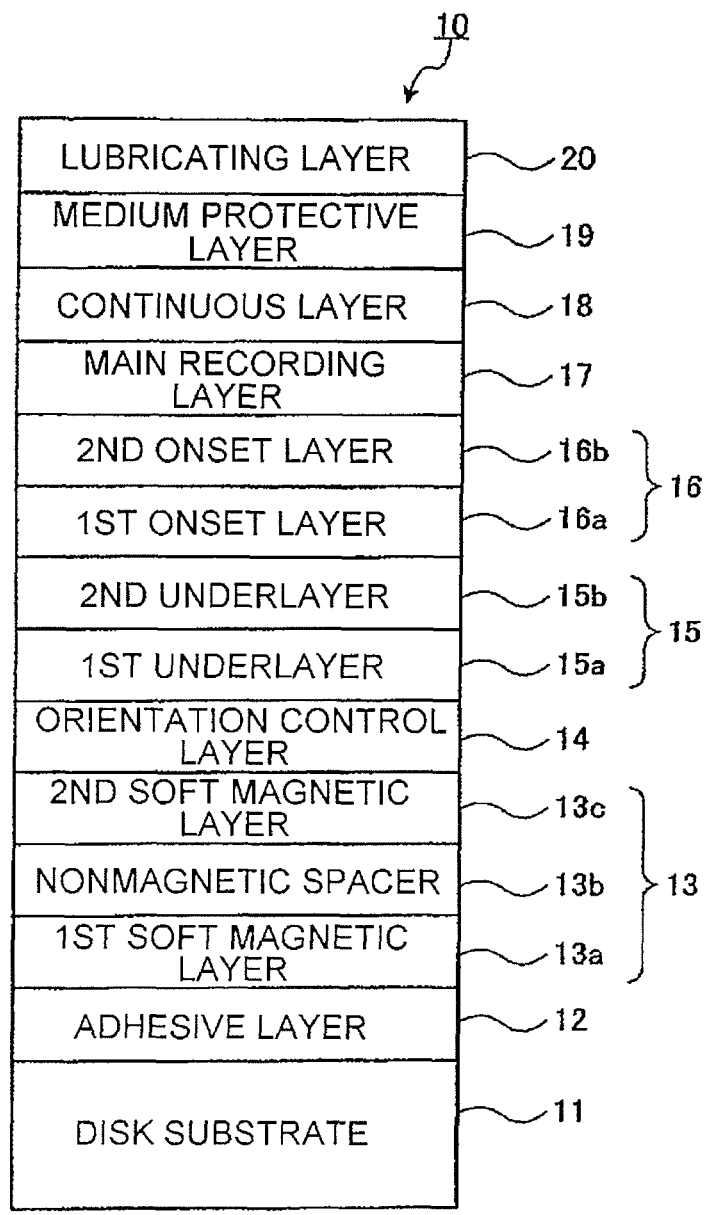
FIG. 8 is a cross-sectional structural view of a magnetic recording medium according to an embodiment of the third invention.

FIG. 8 is a cross-sectional view showing the structure of a perpendicular magnetic recording medium 10 according to this embodiment. The perpendicular magnetic recording medium 10 is a magnetic recording medium for use in the perpendicular magnetic recording/reproducing system.

The perpendicular magnetic recording medium 10 shown in FIG. 8 is formed by stacking a disk substrate 11, an adhesive layer 12, a first soft magnetic layer 13a, a nonmagnetic spacer layer 13b, a second soft magnetic layer 13c, an orientation control layer 14, a first underlayer 15a, a second underlayer 15b, a first onset layer 16a, a second onset layer 16b, a main recording layer 17, a continuous layer 18, a medium protective layer 19, and a lubricating layer 20 in this order. The first soft magnetic layer 13a, the nonmagnetic spacer layer 13b, and the second soft magnetic layer 13c jointly form a soft magnetic layer 13. The first underlayer 15a and the second underlayer 15b jointly form an underlayer 15. The first onset layer 16a and the second onset layer 16b jointly form an onset layer 16.

As the disk substrate 11, use can be made of, for example, a glass substrate, an aluminum substrate, a silicon substrate, a plastic substrate, or the like. When using the glass substrate as the disk substrate 10, it can be produced by, for example, molding an amorphous aluminosilicate glass into a disk shape by direct press to produce a glass disk, then grounding, polishing, and chemically strengthening this glass disk in sequence. Since smoothness and high rigidity are obtained, the aluminosilicate glass makes it possible to more stably reduce the magnetic spacing, particularly the flying height of a magnetic head. Further, it is possible to obtain high rigidity and strength by chemically strengthening the aluminosilicate glass.

The adhesive layer 12 is a layer for improving the adhesion to the disk substrate 10 and thus can prevent stripping of the soft magnetic layer 13. As a material of the adhesive layer 12, use may be made of, for example, a Ti-containing material. In terms of practical use, the thickness of the adhesive layer 12 is preferably set to 1 nm to 50 nm.

As each of the first soft magnetic layer 13a and the second soft magnetic layer 13c of the soft magnetic layer 13, use can be made of, for example, a FeCoTaZr film or the like. As the composition of the nonmagnetic spacer layer 13b, a nonmagnetic material Ru film or the like can be cited. By interposing the nonmagnetic spacer layer 13b between the first soft magnetic layer 13a and the second soft magnetic layer 13c, the soft magnetic layer 13 is configured to have AFC (Antiferromagnetic exchange coupling). By this, magnetization directions of the soft magnetic layer 13 can be aligned along a magnetic path (magnetic circuit) with high accuracy and thus the perpendicular component of the magnetization is extremely reduced, so that it is possible to reduce noise generated from the soft magnetic layer 13.

The orientation control layer 14 has a function of protecting the soft magnetic layer 13, a function of facilitating the alignment of the orientation of crystal grains of the underlayer 15, and further a function of miniaturizing the crystal grains. In this embodiment, the orientation control layer 14 contains Ni as a main material and an oxide material. The material of the orientation control layer 14 is preferably selected from alloys of NiW, NiPd, NiCr, NiMo, NiTa, NiV, NiNb, NiZr, NiHf, and NiCu having a fcc structure composed mainly of Ni. The oxide material added to the orientation control layer 14 is preferably selected from $SiO_2$, SiO, $TiO_2$, TiO, $Cr_2O_3$, $Zr_2O_3$, $Ta_2O_5$, $Al_2O_3$, $W_2O_5$, $Mo_2O_5$, $V_2O_5$, and $Nb_2O_5$. By adding the oxide material to the orientation control layer 14 as described above, particularly the function of miniaturizing the crystal grains is enhanced.

A material forming the underlayer 15 has a hcp structure and can grow crystals with a hcp structure of a material forming the main recording layer 17 into a granular structure. Therefore, as the crystal orientation of the underlayer 15 is enhanced, it is possible to improve the orientation of the main recording layer 17. As the material of the underlayer 15, RuCr or RuCo can be cited other than Ru. Ru takes a hcp structure and can well orient the main recording layer composed mainly of Co.

The underlayer 15 is in the form of a Ru film with a two-layer structure. When forming the second underlayer 15b on the upper layer side, the Ar gas pressure is set higher than that set when forming the first underlayer 15a on the lower layer side. As the gas pressure increases, the mean free path of sputtering plasma ions decreases and thus the film forming rate decreases to make it possible to improve the crystal orientation. Further, the size of a crystal lattice decreases as the pressure increases. Since the size of a Ru crystal lattice is larger than that of a Co crystal lattice, if the size of the Ru crystal lattice is reduced, it approaches that of the Co crystal lattice so that it is possible to further improve the crystal orientation of the Co granular layer.

By forming a nonmagnetic granular layer on the hcp crystal structure of the underlayer 15 and growing a granular layer of the main recording layer 17 thereon, the nonmagnetic granular layer has a function of separating the magnetic granular layer from an initial stage (buildup). The compositions of the first onset layer 16a and the second onset layer 16b are nonmagnetic CoCr—$SiO_2$ and magnetic CoCrPt—$Cr_2O_3$, respectively.

The main recording layer 17 is a magnetic layer having a hcp crystal structure. As the main recording layer 17, use can be made of CoCrPt—$Cr_2O_3$, CoCrPt—$SiO_2$, CoCrPt—$TiO_2$, or the like. Using a hard magnetic target made of CoCrPt and containing silicon oxide ($SiO_2$) or titanium oxide ($TiO_2$) as a nonmagnetic substance, a hcp crystal structure is formed. The main recording layer 17 can be suitably set in a range of 7 nm to 15 nm. The composition of the target for forming the main recording layer 17 contains CoCrPt and $SiO_2$ (or $TiO_2$) in the ratio of about 9:1 (mol %). The nonmagnetic substance is segregated to form grain boundaries around the magnetic substance and magnetic grains form a columnar granular structure. These magnetic grains are epitaxially grown continuously from the granular structure of the onset layer 16.

The continuous layer 18 is in the form of a CoCrPtB film in which the magnetism continues in the plane direction. The continuous layer 18 is formed by a low Ar gas and its thickness is preferably 10 nm or less and more preferably 5 nm or less.

Using an evacuated film forming apparatus, the layers from the adhesive layer 12 to the continuous layer 18 are formed in sequence on the disk substrate 11 in an Ar atmosphere by a DC magnetron sputtering method. In terms of the productivity, it is preferable to form these layers and films by in-line type film formation.

The medium protective layer 19 is a protective layer for protecting the main recording layer 17 from an impact of a magnetic head. As a material forming the medium protective layer 19, use can be made of, for example, Cr, a Cr alloy, carbon, zirconia, silica, or the like. The medium protective layer 19 is formed by film formation of, for example, carbon by a CVD method while maintaining a vacuum. In general, carbon formed into a film by the CVD method is improved in film hardness as compared with that by the sputtering method. Thus, it is possible to protect the perpendicular magnetic recording layer more effectively against the impact from the magnetic head.

The lubricating layer 20 is formed by, for example, diluting perfluoropolyether (PFPE) being a liquid lubricant with a Freon-based solvent or the like, coating it on the medium surface by a dip coating method, a spin coating method, or a spray method, and, if necessary, carrying out a heat treatment. The thickness of the lubricating layer 20 is about 1 nm. This perfluoropolyether has a straight chain structure to thereby exhibit proper lubrication performance for a magnetic disk and, because of having hydroxyl groups (OH) as end groups, it can exhibit high adhesion performance with respect to a carbon medium protective layer.

Next, a description will be given of Examples 1 to 7 in which a material of an orientation control layer 14 was changed in the same structure as the perpendicular magnetic recording medium 10 shown in FIG. 8 and of Comparative Examples 1 to 3 in which materials of an orientation control layer 14 and an underlayer 15 were changed in the same structure as the perpendicular magnetic recording medium 10 shown in FIG. 8.

Example 1

An amorphous aluminosilicate glass was molded into a disk shape by direct press, thereby producing a glass disk. This glass disk was ground, polished, and chemically strengthened in sequence, thereby obtaining a smooth nonmagnetic disk substrate 11 in the form of a chemically strengthened glass disk. The disk substrate 11 was a 2.5-inch magnetic disk substrate having a diameter of 65 mm, an inner diameter of 20 mm, and a disk thickness of 0.635 mm. The surface roughness of the obtained disk substrate 11 was observed by an AFM (atomic force microscope) and it was confirmed to be a smooth surface with Rmax of 2.18 nm and Ra of 0.18 nm. Rmax and Ra follow Japanese Industrial Standard (WS).

Then, using a C3040 sputtering film forming apparatus manufactured by Canon ANELVA Corporation, an adhesive layer 12, a soft magnetic layer 13, an orientation control layer 14, an underlayer 15, a first onset layer 16a, a second onset layer 16b, and a main recording layer 17 were formed in sequence on the disk substrate 110 by DC magnetron sputtering.

First, the adhesive layer 112 was formed by the use of a CrTi target so as to be a CrTi45 (Cr: 55 at %, Ti: 45 at %) layer of 10 nm.

Then, using a FeCoTaZr target, first and second soft magnetic layers 13a and 13c were each formed so as to be an amorphous FeCoTaZr (Fe: 37 at %, Co: 55 at %, Ta: 3 at %, Zr: 5 at %) layer of 25 nm. As a nonmagnetic spacer layer 13b, a Ru layer of 0.5 nm was formed by the use of a Ru target.

Then, the orientation control layer 14 in the form of a NiW—TiO$_2$ (Ni: 86 at %, W: 8 at %, TiO$_2$: 6 at %) film of 10 nm was formed on the soft magnetic layer 13.

Then, on the orientation control layer 14, a first underlayer 15a made of Ru and having a thickness of 10 nm was formed at a film forming gas pressure of 1.5 Pa and, further, a second underlayer 15b made of Ru and having a thickness of 10 nm was formed at a film forming gas pressure of 6.0 Pa.

Then, on the underlayer 15, the first onset layer 16a in the form of a CoCr—SiO$_2$ (Co: 53 at %, Cr: 35 at %, SiO$_2$: 12 at %) film of 1.0 nm was formed and, further, the second onset layer 16b in the form of a CoCrPt—Cr$_2$O$_3$ (Co: 67 at %, Cr: 11 at %, Pt: 17 at %, Cr$_2$O$_3$: 5 at %) film of 3 nm was formed.

Then, using a hard magnetic target made of CoCrPt—TiO$_2$ (Co: 64 at %, Cr: 11.5 at %, Pt: 14.5 at %, TiO$_2$: 10 at %) with a hcp crystal structure of 8 nm, the main recording layer 17 was formed on the onset layer 16. Further, a continuous layer 18 was formed by the use of a target of CoCrPtB (Co: 60 at %, Cr: 20 at %, Pt: 15 at %, B: 5 at %) of 7.5 nm.

Then, a medium protective layer 19 made of hydrogenated carbon was formed by the CVD method. Since the film hardness is improved by the use of hydrogenated carbon, it is possible to protect the perpendicular main recording layer against an impact from a magnetic head.

After this, a lubricating layer 20 made of PFPE (perfluoropolyether) was formed by the dip coating method. The thickness of the lubricating layer 20 is 1 nm.

The recording/reproducing characteristics of the medium obtained by the above-mentioned processes were evaluated. The measurement was performed using a R/W analyzer and a magnetic head of the perpendicular magnetic recording system having a SPT element on the recording side and a GMR element on the reproducing side, wherein the recording density was set to 1200 kfci. In this event, the flying height of the magnetic head was 10 nm.

Comparative Example 1

In the same film structure as in Example 1 described above, NiW (Ni: 92 at %, W: 8 at %) was used as an orientation control layer 14.

Comparative Example 2

In the same film structure as in Example 1 described above, Ru—SiO$_2$ (Ru: 95 at %, SiO$_2$: 5 at %) was used as each of a first underlayer 15a and a second underlayer 15b.

Comparative Example 3

In the same film structure as in Example 1 described above, NiW (Ni: 92 at %, W: 8 at %) was used as an orientation control layer 14 and Ru—SiO$_2$ (Ru: 95 at %, SiO$_2$: 5 at %) was used as a second underlayer 15b.

Example 2

In the same film structure as in Example 1 described above, NiW—TiO$_2$ (Ni: 89 at %, W: 8 at %, TiO$_2$: 3 at %) was used as an orientation control layer 14.

Example 3

In the same film structure as in Example 1 described above, NiW—SiO$_2$ (Ni: 87 at %, W: 8 at %, SiO$_2$: 5 at %) was used as an orientation control layer 14.

Example 4

In the same film structure as in Example 1 described above, NiW—Cr$_2$O$_3$ (Ni: 82 at %, W: 7 at %, Cr$_2$O$_3$: 11 at %) was used as an orientation control layer 14.

Example 5

In the same film structure as in Example 1 described above, NiW—Ta$_2$O$_5$ (Ni: 62 at %, W: 5 at %, Ta$_2$O$_5$: 33 at %) was used as an orientation control layer 14.

Example 6

In the same film structure as in Example 1 described above, NiW—Nb$_2$O$_5$ (Ni: 74 at %, W: 6 at %, Nb$_2$O$_5$: 20 at %) was used as an orientation control layer 14.

Example 7

In the same film structure as in Example 1 described above, NiW—Al$_2$O$_3$ (Ni: 85 at %, W: 7 at %, Al$_2$O$_3$: 8 at %) was used as an orientation control layer 14.

Example 8

In the same film structure as in Example 1 described above, NiPd—TiO$_2$ (Ni: 86 at %, Pd: 8 at %, TiO$_2$: 6 at %) was used as an orientation control layer 14.

Example 9

In the same film structure as in Example 1 described above, NiCr—TiO$_2$ (Ni: 86 at %, Cr: 8 at %, TiO$_2$: 6 at %) was used as an orientation control layer 14.

Example 10

In the same film structure as in Example 1 described above, NiMo—TiO$_2$ (Ni: 86 at %, Mo: 8 at %, TiO$_2$: 6 at %) was used as an orientation control layer 14.

Example 11

In the same film structure as in Example 1 described above, NiTa—TiO$_2$ (Ni: 86 at %, Ta: 8 at %, TiO$_2$: 6 at %) was used as an orientation control layer 14.

Example 12

In the same film structure as in Example 1 described above, NiV—TiO$_2$ (Ni: 86 at %, V: 8 at %, TiO$_2$: 6 at %) was used as an orientation control layer 14.

Example 13

In the same film structure as in Example 1 described above, NiNb—TiO$_2$ (Ni: 86 at %, Nb: 8 at %, TiO$_2$: 6 at %) was used as an orientation control layer 14.

Example 14

In the same film structure as in Example 1 described above, NiZr—TiO$_2$ (Ni: 86 at %, Zr: 8 at %, TiO$_2$: 6 at %) was used as an orientation control layer 14.

Example 15

In the same film structure as in Example 1 described above, NiHf—TiO$_2$ (Ni: 86 at %, Hf: 8 at %, TiO$_2$: 6 at %) was used as an orientation control layer 14.

Example 16

In the same film structure as in Example 1 described above, NiCu—TiO$_2$ (Ni: 86 at %, Cu: 8 at %, TiO$_2$: 6 at %) was used as an orientation control layer 14.

As each of magnetic recording media 10 according to the Examples, the magnetic recording medium 10 with the structure described using FIG. 8 is manufactured. In the manufacturing processes of the magnetic recording medium 10, respective layers are formed in sequence on a disk substrate 11 by, for example, the soft magnetic layer forming process, the magnetic recording layer forming process, and so on. The processes of forming the respective layers may be the same as or similar to known processes except the soft magnetic layer forming process.

FIG. 9 shows the evaluation results of the average crystal grain sizes evaluated from plan-view photographs of a transmission electron microscope, Δθ50 evaluated by an X-ray diffraction apparatus, and the recording/reproducing characteristics S/N with respect to the magnetic recording media manufactured in Examples 1 to 16 and Comparative Examples 1 to 3. The area of each crystal grain derived from a plan-view photograph of the transmission electron microscope is converted into a circle and the radius of that circle is defined as a crystal grain size. The average crystal grain size is an average value derived from several hundreds of crystal grains. Δθ50 represents the full width at half maximum of Ru (002) crystal orientation peak in a rocking curve.

From FIG. 9, it can be confirmed that, in Examples 1 to 7 in which an oxide was added only to the orientation control layer 14 while no oxide was added to the underlayer 15, the magnetic grain size of the magnetic layer was reduced and, further, as compared with Comparative Examples 2 and 3 in which an oxide was added to the underlayer, degradation in crystal orientation of magnetic grains was suppressed.

The layer structures, the materials of the members, the numbers, the sizes, the processing sequences, and so on in the above-mentioned embodiment are only examples and the third invention can be carried out by changing them in various ways within a range capable of exhibiting the effect of the third invention. Other than that, the third invention can be carried out with proper changes within a range not departing from the object of the third invention.

INDUSTRIAL APPLICABILITY

This invention can be used, for example, as a perpendicular magnetic recording medium adapted to be mounted in a HDD (hard disk drive) or the like of the perpendicular magnetic recording system.

The invention claimed is:

1. A perpendicular magnetic recording medium adapted to record information by a perpendicular magnetic recording system, wherein the perpendicular magnetic recording medium comprises:
    a substrate;
    a soft magnetic layer formed over the substrate;
    a pre-underlayer formed over the soft magnetic layer and containing seed crystal grains, comprising crystal grains of an alloy of Ni and Co, as crystal grains that serve as a base for crystal grains of an upper layer;
    an underlayer formed over the pre-underlayer and consisting of crystal grains that control an orientation of crystal grains of an upper layer, wherein the crystal grains consisting of V;
    a first non-magnetic onset layer formed directly on an upper surface of the underlayer;
    a second non-magnetic onset layer formed directly on an upper surface of the first non-magnetic onset layer;
    a magnetic recording layer containing magnetic crystal grains with a crystal structure that is controlled by the underlayer, wherein the magnetic recording layer is formed directly on an upper surface of the second non-magnetic onset layer;
    wherein the pre-underlayer contains the seed crystal grains that serve as the base for the crystal grains of the underlayer, and an addition substance consisting of boron that is added between the seed crystal grains, and
    wherein the crystal structure of the magnetic crystal grains is same as a crystal structure of the crystal grains in the underlayer, but different from a crystal structure of the seed crystal grains.

2. The perpendicular magnetic recording medium according to claim 1, wherein the addition substance is a substance that does not chemically react with a material of the soft magnetic layer and the seed crystal grains.

3. The perpendicular magnetic recording medium according to claim 2, wherein the addition substance is a solid substance.

4. The perpendicular magnetic recording medium according to claim 1, wherein said pre-underlayer is approximately 10 nm thick.

5. The perpendicular magnetic recording medium according to claim 1, wherein the second non-magnetic onset layer comprises CoCrPt—Cr$_2$O$_3$.

6. The perpendicular magnetic recording medium according to claim 1, wherein the first non-magnetic onset layer is thinner than the second non-magnetic onset layer.

7. The perpendicular magnetic recording medium according to claim 5, wherein the first non-magnetic onset layer comprises CoCr—SiO$_2$.

8. The perpendicular magnetic recording medium according to claim 1, wherein the seed crystal grains have a body-centered cubic (BCC) crystal structure or a BCC crystal structure close to amorphous.

9. The perpendicular magnetic recording medium according to claim 1, wherein the magnetic recording layer comprises CoCrPt and an oxide selected from the group consisting of a silicon oxide and a titanium oxide and a ratio of the CoCrPt to the oxide is 9:1 by mol %.

10. The perpendicular magnetic recording medium according to claim 1 further comprises:
    a continuous layer formed over the magnetic recording layer, wherein the continuous layer comprises CoCrPtB;
    a medium protective layer formed over the continuous layer; and
    a lubricating layer formed over the medium protective layer.

11. The perpendicular magnetic recording medium according to claim 10, wherein a thickness of the continuous layer is 5 nm or less and a thickness of the lubricating layer is 0.5 nm to 2 nm.

* * * * *